United States Patent
Huang et al.

(10) Patent No.: US 7,311,991 B2
(45) Date of Patent: Dec. 25, 2007

(54) HYDROGEN STORAGE-BASED ELECTROCHEMICAL SYSTEM AND METHOD OF PREPARATION

(75) Inventors: Qunjian Huang, Shanghai (CN); Chang Wei, Niskayuna, NY (US); Tao Wang, Boston, MA (US); Hai Yang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 378 days.

(21) Appl. No.: 11/172,249

(22) Filed: Jun. 30, 2005

(65) Prior Publication Data

US 2007/0000388 A1    Jan. 4, 2007

(51) Int. Cl.
*H01M 4/58*    (2006.01)
(52) U.S. Cl. .................. 429/44; 429/218.2; 148/513
(58) Field of Classification Search .............. 96/108; 429/12, 27, 40, 44, 209, 218.2, 232; 420/900; 148/513
See application file for complete search history.

(56) References Cited

U.S. PATENT DOCUMENTS

| | | | |
|---|---|---|---|
| 5,387,478 A * | 2/1995 | Muta et al. .................. 429/59 |
| 6,096,144 A * | 8/2000 | Ishii et al. ................... 148/513 |
| 6,284,066 B1 * | 9/2001 | Shinya et al. ............... 148/513 |
| 6,569,567 B1 * | 5/2003 | Reichman et al. ......... 429/218.2 |
| 6,613,471 B2 | 9/2003 | Ovshinsky et al. ........... 429/42 |
| 2002/0122982 A1 * | 9/2002 | Okada et al. ............ 429/218.2 |

OTHER PUBLICATIONS

Mao-Sung Wu et al., "Electrochemical investigation of hydrogen-storage alloy electrode with duplex surface modification", International Journal of Hydrogen Energy 29 (2004), pp. 1263-1269.
Bin-Hong, Liu, J-Y. Lee, "The electrochemical activation and surface properties of Zr-based $AB_2$ metal hydride electrodes", Journal of Alloys and Compounds 255 (1997), pp. 43-49.
Bin-Hong Liu et al., "Improved electrochemical performance of $AB_2$-type metal hydride electrodes activated by the hot-charging process", Journal of Alloys and Compounds 245 (1996), pp. 132-141.

* cited by examiner

*Primary Examiner*—Frank M. Lawrence
(74) *Attorney, Agent, or Firm*—Shawn A. McClintic; William E. Powell, III

(57) ABSTRACT

A method for preparation of a hydrogen-storage based electrode comprises treating a powder comprising at least one metal hydride with a first solution. The first solution comprises a first alkaline base and a first reducing agent. The method further comprises fabricating the electrode using the powder and treating the electrode with a second solution comprising a second alkaline base and a second reducing agent.

19 Claims, 3 Drawing Sheets

HYDROGEN STORAGE-BASED ELECTROCHEMICAL SYSTEM AND METHOD OF PREPARATION

BACKGROUND OF THE INVENTION

This invention relates to a method for preparing an electrode for an electrochemical system. More particularly, this invention relates to a two-step chemical activation process for a hydrogen storage-based electrode comprising a metal hydride (MH) for an electrochemical system.

An electrochemical system, such as a fuel cell, is capable of efficient energy conversion and can be used in a variety of applications including transportation applications, portable power sources, home and commercial power generation, large power generation and any other applications that would benefit from the use of such a system. Fuel cell systems may be fueled with pure hydrogen and emit only water and energy in the form of electric power and heat. A battery can also be a source of energy that is limited to the stored energy it holds. A fuel cell is capable of generating energy as long as a fuel is supplied.

In a fuel cell device, hydrogen is supplied to the anode or stored within the anode while an oxidant is supplied to the cathode. Hydrogen can also be stored at the negative electrode of a battery. For example, metal hydrides are commonly used as a material for the negative electrode of batteries, such as air-metal hydride batteries and Ni-metal hydride batteries, or for the anode of solid-state hydrogen storage-based fuel cells. Metal hydride materials or electrodes comprising metal hydrides need to be activated before being integrated with cathodes and other components to form the batteries or the fuel cells. This is necessary because the untreated metal hydrides may form an oxide layer on the surface of the metal hydride leading to poor charging efficiency and low discharge capacity. An activation process is essential to remove the oxide layer from the surface of the metal hydride. Furthermore, in the absence of an activation process, additional electrochemical charge-discharge cycles are needed to reach the maximum storage capacity of the metal hydride material and the initial discharge capacity is too low to run the electrochemical system efficiently.

There are several processes that are used to prevent oxide formation on the surface of the metal hydride or to activate the metal hydride material such as metal or alloy coating, hot alkali treatment, acid treatment, and chemical reduction method using reductants in alkali solution. Generally, these methods are employed to treat the metal hydride powder. Further activation of the anode or the negative electrode comprising the metal hydride powder is not done if the powder itself is activated through an activation process. Similarly when the fabricated negative electrode or anode comprising the metal hydride powder is treated in an activation process after the fabrication, the activation process of the metal hydride powder itself is not practiced.

Therefore there is a need for an efficient activation process to activate the hydrogen storage based electrodes comprising metal hydrides in electrochemical systems.

BRIEF DESCRIPTION OF THE INVENTION

In one aspect, a method for preparation of a hydrogen-storage based electrode comprises treating a powder comprising at least one metal hydride with a first solution. The first solution comprises a first alkaline base and a first reducing agent. The method further comprises fabricating the electrode using the powder and treating the electrode with a second solution comprising a second alkaline base and a second reducing agent.

In another aspect, an electrochemical system for storage of hydrogen comprising a metal hydride electrode. The electrode is prepared by treating a powder comprising the metal hydride with a first solution. The first solution comprises a first alkaline base and a first reducing agent. The method for preparing the electrode further comprises fabricating the electrode using the powder and treating the electrode with a second solution comprising a second alkaline base and a second reducing agent.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
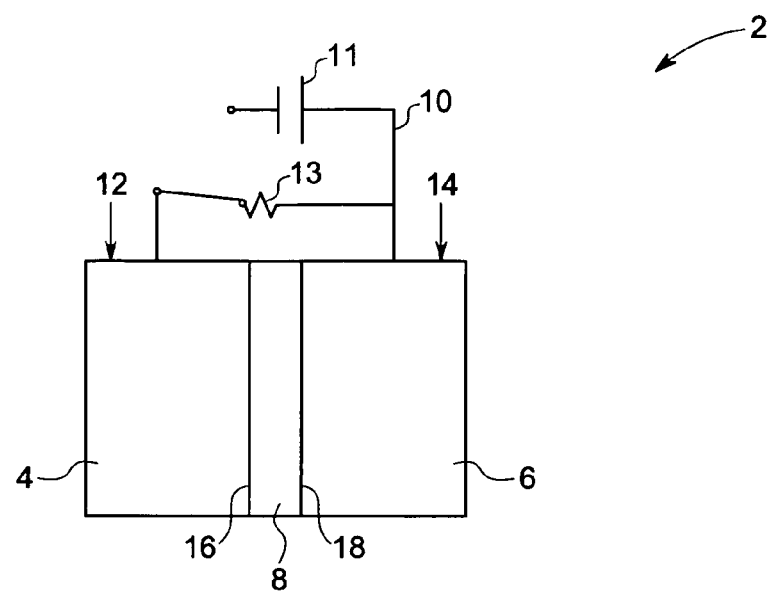
FIG. 1 illustrates a schematic diagram of an exemplary dual mode electrochemical system comprising a hydrogen storage-based electrode.

Described herein is a method to activate a hydrogen-storage based electrode in an electrochemical device. The method described herein involves treating a powder comprising at least one metal hydride with a first solution. The first solution comprises a first alkaline base and a first reducing agent. The method further comprises fabricating the hydrogen storage-based electrode using the powder and treating the electrode with a second solution. The second solution comprises a second alkaline base and a second reducing agent.

The electrochemical performance of the hydrogen-storage based electrode improves when the hydrogen storage-based electrode is treated with the disclosed method. The disclosed method of activating the hydrogen storage-based electrode involves treatment of the electrode in two steps. In the initial step the metal hydride powder, which powder is the active part of the hydrogen storage based electrode is treated with the first solution. In the next step the electrode itself is treated with the second solution once it is fabricated.

In one embodiment, the electrode is used as an anode or negative electrode in electrochemical systems including but not limited to an air metal hydride battery, Ni-metal hydride batteries, fuel cells and regenerative fuel cells. In one embodiment, the electrode comprises a metal hydride selected from the group consisting of alkali metal borohydrides, alkaline earth borohydrides, alkaline earth alanates, catalyzed complex hydrides and mixtures thereof. In some embodiments, metal hydride is selected from the group consisting of metal hydrides of $AB_5$ alloy, $AB_2$ alloy, AB alloy, $A_2B$ alloy, $A_2B_{17}$ alloy and $AB_3$ alloy. The $AB_5$ ally includes, but is not limited to $LaNi_5$, $CaNi_5$, and $MA_xB_yC_z$, wherein M is a rare earth element component, A is one of the elements Ni and Co, B is one of the elements Cu, Fe and Mn, C as one of the elements Al, Cr, Si, Ti, V and Sn, and x, y and z satisfy the following relations, wherein $2.2 \leq x \leq 4.8$, $0.01 \leq y \leq 2.0$, $0.01 \leq z \leq 0.6$, $4.8 \leq x+y+z \leq 5.4$. Typical examples of $AB_2$ include, but are not limited to Zr—V—Ni, Zr—Mn—Ni, Zr—Cr—Ni, TiMn, and TiCr. Typical AB type alloys include, but are not limited to TiFe and TiNi. Typical $A_2B$ type alloys include, but are not limited to $Mg_2Ni$. Typical $A_2B_{17}$ type alloys include, but are not limited to $La_2Mg_{17}$. Typical $AB_3$ type alloys include, but are not limited to $LaNi_3$, $CaNi_3$, and $LaMg_2Ni_9$. In some embodiments, the anode material comprises catalyzed complex hydrides including, but not limited to borides, carbides, nitrides, aluminides, and silicides. Typical examples of complex catalyzed hydrides are alanates such as $NaAlH_4$, $Zn(AlH_4)_2$, $LiAlH_4$ and $Ga(AlH_4)_3$ and borohydrides such as $Mg(BH_4)_2$, $Mn(BH_4)_2$ and $Zn(BH_4)_2$, In some other embodiments, the anode material comprises carbon nanotubes and BN nanotubes. In some embodiments, the anode materials comprises conducting polymers such as polypyrrole and polyaniline.

In the disclosed method, the metal hydride powder is treated in a first solution comprising a first reducing agent and a first alkaline base. The first reducing agent is selected from the group consisting of sodium borohydride, potassium borohydride, hydrazine, citrate salt and mixtures thereof. The concentration of the first reducing agent in the first solution is from about 0.01 molar to about 0.05 molar.

The first alkaline base in the first solution is selected from the group consisting of potassium hydroxide, sodium hydroxide, lithium hydroxide, calcium hydroxide, ammonium hydroxide and mixtures thereof. The concentration of the first alkaline base in the first solution is from about 1 molar to about 6 molar.

The temperature at which the activation process is carried out ranges from about 30° C. to about 90° C. In the first step, wherein the metal hydride powder is treated with a first solution, the treatment process may require a time between about 1 hour to about 5 hours. In the subsequent step when the electrode is treated with the second solution, the treatment process may continue from about 10 minutes to about 60 minutes.

The first alkaline base removes any metal oxide formed on the surface of the metal hydride powder and the first reducing agent forms hydrogen on the surface of the metal hydride powder to protect the surface from further oxidation. In one embodiment, the first solution comprises sodium borohydride ($NaBH_4$) and potassium hydroxide (KOH). Sodium borohydride is a water reactive hydride, which under exposure to water reacts to form atomic hydrogen as given in reaction (1) below.

$$NaBH_4 + 2H_2O \Rightarrow NaBO_2 + 4H_2 \quad (1)$$

Once the metal hydride powder is treated with the first solution, an alloy slurry is prepared by mixing the treated metal hydride powder and other conductive additives such as nickel powder, cobalt powder or activated carbon. In the subsequent steps the hydrogen storage-based electrode is prepared by pressing the slurry onto a metal substrate. In one embodiment, the hydrogen storage-based electrode is prepared by pasting the alloy slurry comprising the treated metal hydride powder onto both sides of a metal substrate such as a piece of nickel foam. Foams of any other metal that is compatable in alkaline solution including stainless steel may also be used. The conductivity of the electrode can be increased by increasing the conductivity of electrode substrate. The electrode substrate includes but is not limited to foam, mesh, grid, matte, foil, plate and expanded metal. Binders such as polytetrfluoroethylene (PTFE), polyvinyl alcohol (PVA), or/and carboxymethyl cellulose (CMC) may also be added to the alloy slurry.

The electrode, as prepared above, is treated in subsequent steps with the second solution comprising the second base and the second reducing agent. The second reducing agent is selected from the group consisting of sodium borohydride, potassium borohydride, hydrazine, citrate salt and mixtures thereof. The concentration of the second reducing agent in the second solution is from about 0.01 molar to about 0.05 molar.

The second alkaline base in the second solution is selected from the group consisting of potassium hydroxide, sodium hydroxide, lithium hydroxide, calcium hydroxide, ammonium hydroxide and mixtures thereof. The concentration of the second alkaline base in the second solution is from about 1 molar to about 6 molar. This treatment process removes the metal oxide formed on the surface of the electrodes during the fabrication process.

As described earlier, in one embodiment, the hydrogen storage-based electrode comprising the metal hydride is used as an anode or a negative electrode in electrochemical systems including but not limited to the air metal hydride battery, fuel cells and regenerative fuel cell. FIG. 1 illustrates an exemplary dual mode electrochemical system 2 comprising a hydrogen storage-based electrode 4 capable of storing hydrogen and a second electrode 6, wherein the hydrogen storage-based electrode 4 is activated using the method described in the preceding sections. A substantially electrically insulating and ionically conducting membrane 8 is disposed between the hydrogen storage-based electrode 4 and the second electrode 6. The electrochemical system 2 further comprises an electrolyte. In the dual mode operation, the electrochemical system 2 operates in a first mode and a second mode. In operation, during the first mode of the electrochemical system 2, water 12 and electricity are added to the electrochemical system. In some embodiments, the electricity may be supplied through an external circuit 10. The external circuit comprises a charging circuit 11 and a load 13. The dual electrochemical system 2 electrolyzes water 18 in the presence of the electrolyte and produces hydrogen and oxygen across the membrane 8. The hydrogen produced in the electrolysis process is stored in the hydrogen storage-based electrode 4. The first mode of the dual electrochemical system 2 is generally referred to as the charging mode where hydrogen is produced and stored in the first electrode 4. In the second mode of operation, the dual mode electrochemical system 2 operates as a fuel cell, wherein upon introduction of an oxidant 14, the stored hydrogen reacts with the oxidant 14 across the membrane 8 to chemically react to produce water and electricity. Therefore in the first mode or the charging mode the dual mode electrochemical system works in principle like an electrolyzer, wherein water is split into hydrogen and oxygen by applying electricity in presence of an electrolyte. However, in the second mode or the discharge mode, the dual mode electrochemical system works as a fuel cell, wherein hydrogen and oxygen react to form water and electricity.

Figure 2:
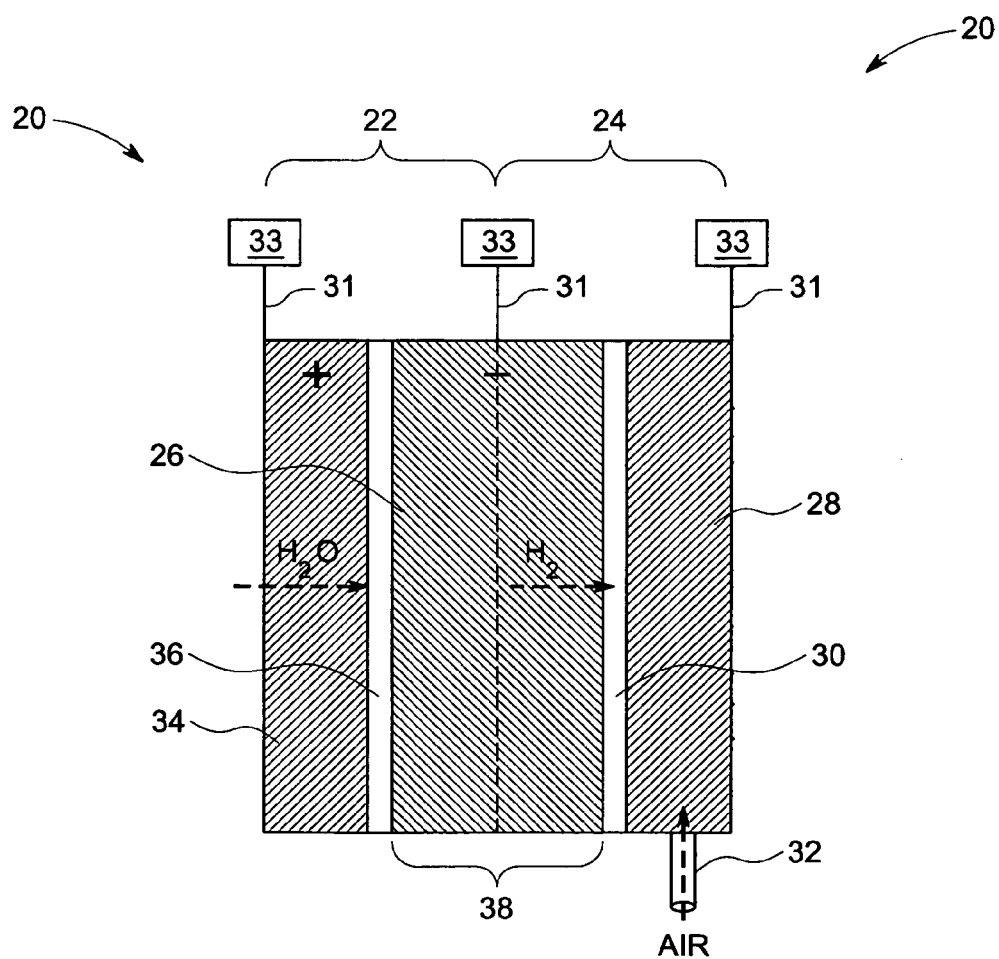
FIG. 2 is a schematic diagram of an electrochemical system for converting electrical energy into chemical energy and chemical energy into electrical energy comprising a common hydrogen storage-based electrode.

FIG. 2 illustrates another exemplary electrochemical system 20 comprising a hydrogen generator component 22 and a fuel cell component 24, the components being structurally and operationally connected via a common electrode 26. The fuel cell component 24 comprises an anode, which is the negative electrode 26, and a fuel cell cathode 28, which is the positive electrode. The anode and cathode may be separated from one another by a fuel cell membrane, such as a proton exchange membrane (PEM) 30. Although the fuel cell structure and materials may vary, the fuel cell component 24 is a galvanic energy conversion device that chemically combines hydrogen and an oxidant within catalytic confines to produce a DC electrical output. In one form of the fuel cell, the fuel cell cathode 28 and materials define passageways for the oxidant, and the negative electrode 26 and materials define the passageways for the fuel. The hydrogen-generating component 22 of the hybrid system provides energy storage capacity and shares the electrode 26 of the fuel cell component 24. The hydrogen-generating component 22 further comprises electrode 34 and separator 36. The structure of the hydrogen-generating component 22 is typically a construction including one or more identical cells, with each cell comprising electrode 34, electrode 26 and separator 36. Electrode 26 comprises hydrogen storage material 38 and performs multiple functions: (1) a solid-state hydrogen source for the fuel cell component 24; (2) an active electrode 26 for the hydrogen-generating component 22; and (3) a portion or all of the electrode functions as an anode of the fuel cell component 24. The common electrode 26 is a hydrogen storage based electrode and may be activated using the methods described in the preceding sections. A gas containing oxygen may be fed into the fuel cell cathode 28 through a cathode supply line 32.

The disclosed method of activating the hydrogen storage based electrode has several advantages. The first step activation is used to remove the oxide layer formed on the surface of the metal hydride powder, while the second step activation can be used to further remove the oxide formed during the electrode fabrication process. The atomic hydrogen formed during the second step can also help the hydrogen diffusion when charging the anode, which can reduce the number of cycle runs to reach the maximum discharge capacity. The activation procedure can produce the Nickel-rich layer on the surface of the metal hydride powder, which nickel-rich layer increases the electro-catalytic activity of hydrogen storage-based electrode and thus improves the hydrogen charging efficiency and the hydrogen discharge kinetics. The application of this two-step activation process can at the same time increase the conductivity of hydrogen storage-based electrode due to the removal of metal oxide, and thus additionally reduce the use of nickel powder leading to the high energy density. The two-step activation process for the hydrogen storage-based electrodes, as described herein, results in the high charging efficiency and high discharge capacity as well as the increase of energy density of the electrode. Therefore, overall performance of the electrochemical system improves, wherein this activation method is used to prepare the hydrogen storage-based electrode.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

A hydrogen storage-based electrode was prepared using the following method. In the first step, a metal hydride powder of $AB_5$ formula, which is commercially available, ($AB_5$: $MmNi_{4.65}Co_{0.88}Mn_{0.45}Al_{0.05}$) was treated in the first solution comprising KOH and $NaBH_4$. The concentration of the KOH was 6M and the concentration of the $NaBH_4$ was 0.03M in the first solution. The treatment with the first solution was carried out at 80° C. and the metal hydride powder was stirred in the first solution for 5 hours. After the treatment with the first solution, the metal hydride powder was rinsed with de-ionized water until a neutral state was achieved. The rinsed metal hydride powder was dried in a vacuum system at 50° C. for 12 hrs. This treatment with the first solution was used to remove the metal oxide formed on the surface of the metal hydride powder and to form atomic hydrogen on the surface of the metal hydride powder to protect the surface from further oxidation.

In the second step, an alloy slurry was prepared by mixing the treated metal hydride powder, conductive additives (nickel powder, cobalt powder or activated carbon), binders (PTFE, PVA and CMC) and several drops of ethanol. The ratio of the weights of the metal hydride powder to PTFE (in milligram, mg) was kept at about 50:4. The hydrogen storage based electrode was prepared by pasting the alloy slurry onto opposing sides of a nickel foam substrate. The electrode was dried at 80° C. for 1 hour. The dried electrode was pressed into a thin sheet under a pressure of 10 Mpa. The fabricated electrode was then treated in a second solution by immersing the electrode into the second solution. The second solution was prepared by adding KOH and $NaBH_4$. The concentration of the KOH was 6M and the concentration of the $NaBH_4$ was 0.03M in the second solution. The treatment of the fabricated hydrogen storage-based electrode with the second solution was carried out at about 80° C. for 20 min. This activation treatment with the second solution was used to remove the metal oxide formed on the surface of the electrode during the fabrication process.

The performance of the electrodes prepared as discussed above was evaluated in a three-electrode system. The three-electrode system included a metal hydride working electrode, platinum counter electrode and SCE reference electrode with salt bridge.

Figure 3:
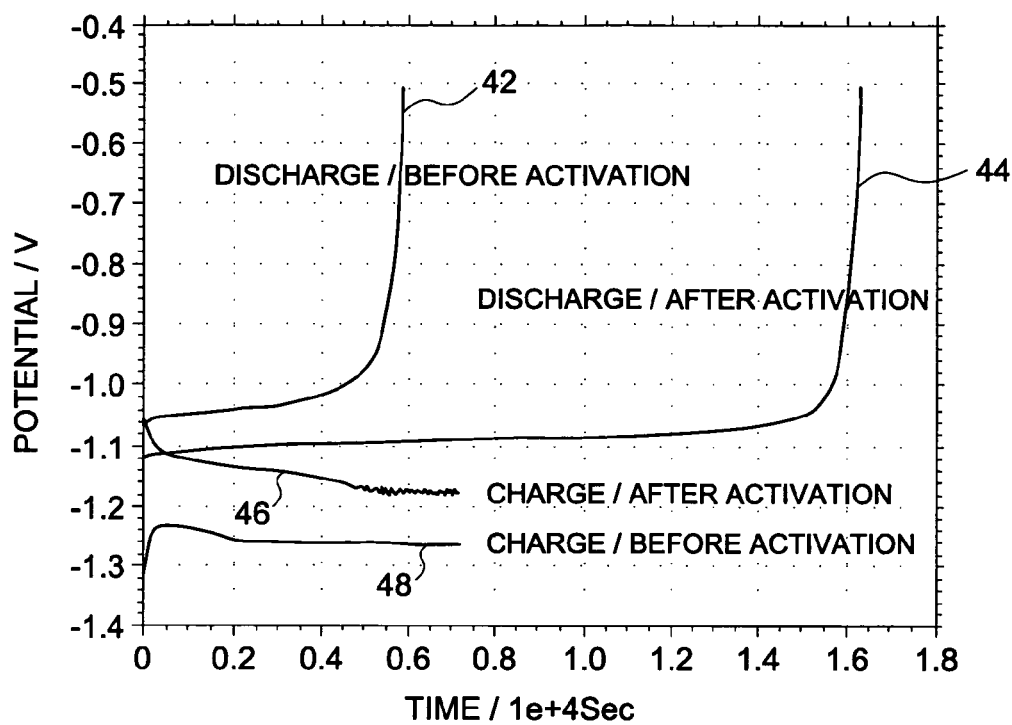
FIG. 3 is an illustration of the comparison of the charge-discharge efficiency with or without the activation process in accordance with the present technique.

FIG. 3 shows the charge and discharge curves of the metal hydride electrodes, with and without activation, in the three-electrode system. The charge and discharge rates were 200 mA/g and 60 mA/g, respectively. The curves 42 and 44 represent the discharge curves before and after activation of the hydrogen-storage based electrodes. Two important characteristics in the performance of the hydrogen storage-based electrodes were observed. (1) Smaller polarization potentials were observed for metal hydride electrodes treated in the above process for both charge and discharge curves, which suggests the reduction of internal resistance due to the removal of metal oxide from the surface of the metal hydride powder and the fabricated electrode after the two-step activation process; (2) hydrogen gas evolved much earlier on the hydrogen storage-based electrode without activation and the discharge capacity largely increased after the activation, which suggests the electro-catalytic activity of the metal hydride in the hydrogen storage-based electrode and the charge efficiency were improved after the activation process.

Figure 4:
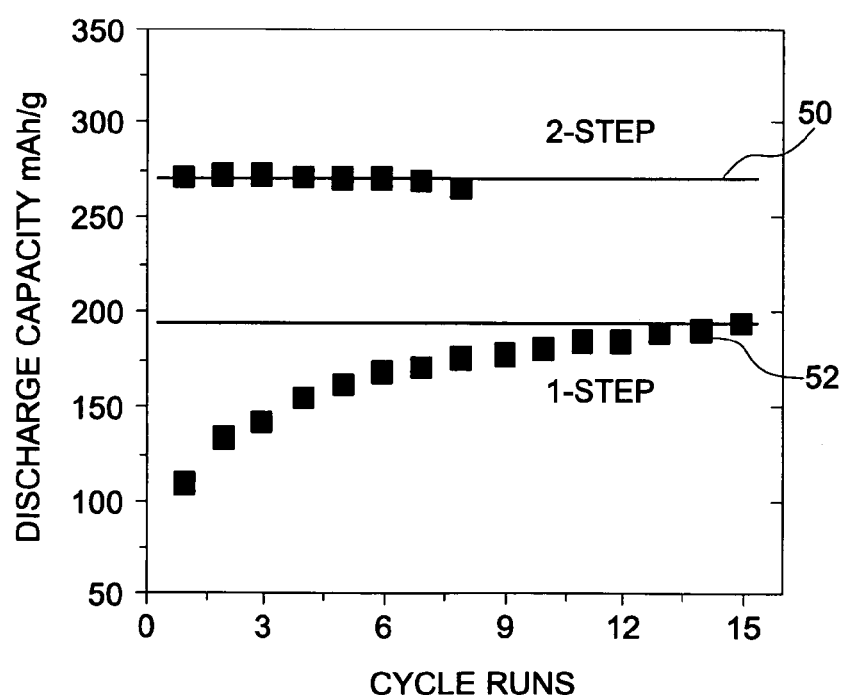
FIG. 4 illustrates the importance of the second step of the activation process wherein the metal oxide is removed from the hydrogen storage based electrodes after fabrication.

FIG. 4 illustrates the importance of the second step of the activation process, wherein the metal oxide is removed from the hydrogen storage-based electrodes after fabrication. Curve 50 is a plot of discharge capacity of the hydrogen storage-based electrode when the activation process involves two steps as described earlier. The maximum discharge capacity was achieved within 3 cycles. Curve 52 illustrates the discharge capacity wherein the hydrogen storage-based electrode was prepared following only the first step wherein only the metal hydride powder was treated in the first solution. The discharge capacity reached the maximum level after 15 cycles. This is a clear indication that both steps in the method of activation described herein contribute to the performance of the hydrogen storage-based electrode.

Figure 5:
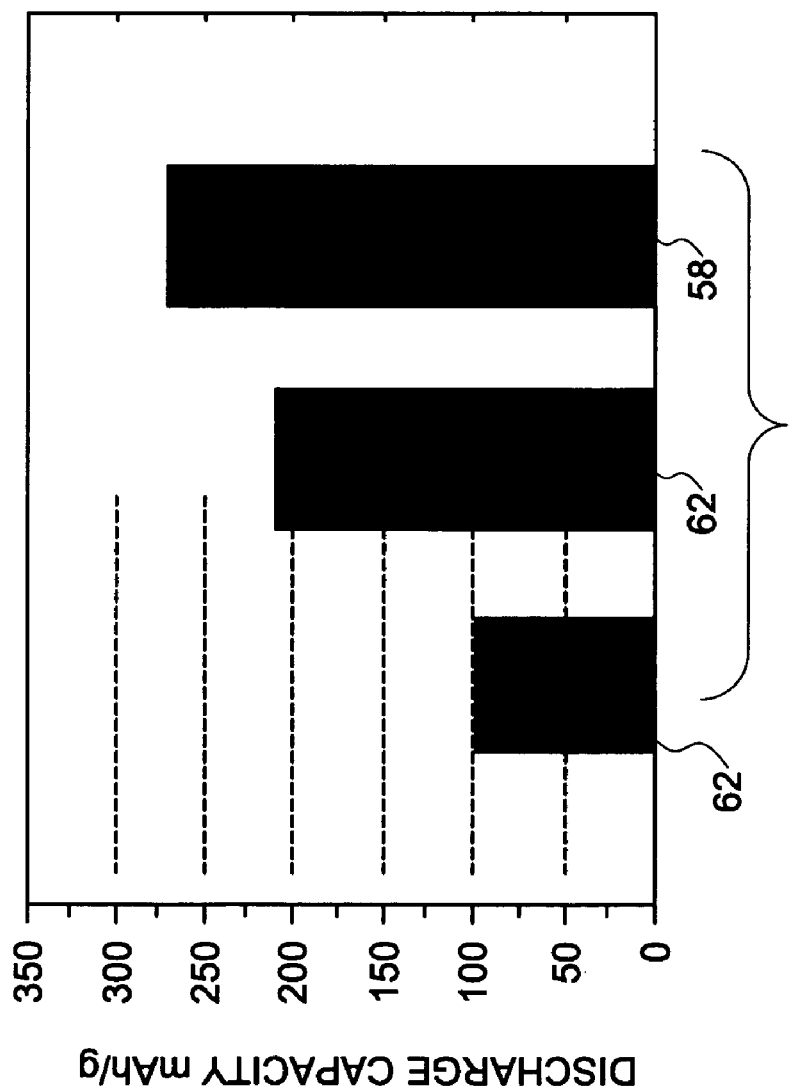
FIG. 5 illustrates the discharge capacities obtained from hydrogen storage-based electrodes without activation, with first step activation and with two-step activation.

FIG. 5 shows a comparison of the discharge capacities obtained from the hydrogen storage-based electrodes without activation, with only single step activation and with two-step activation. The results show that the two-step activation treatment helps to increase the discharge capacity and thus improve the discharge capability. This comparison was evaluated in an electrochemical device comprising three electrodes.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A method for preparation of a hydrogen-storage based electrode comprising:
    treating a powder comprising at least one metal hydride with a first solution comprising a first alkaline base and a first reducing agent;
    fabricating said electrode using said powder; and
    treating said electrode with a second solution comprising a second alkaline base and a second reducing agent.

2. The method of claim 1, wherein said metal hydride is selected from the group consisting of alkali metal borohydrides, alkaline earth borohydrides, alkaline earth alanates, catalyzed complex hydrides and mixtures thereof.

3. The method of claim 1, wherein said first alkaline base and second alkaline base is independently selected from the group consisting of potassium hydroxide, sodium hydroxide, lithium hydroxide, calcium hydroxide, ammonium hydroxide and mixtures thereof.

4. The method of claim 1, wherein said alkaline base is potassium hydroxide.

5. The method of claim 1, wherein concentration of said first alkaline base in said first solution and second alkaline base in said second solution is from about 1 molar to about 6 molar.

6. The method of claim 1, wherein said first reducing agent and second reducing agent is independently selected from the group consisting of sodium borohydride, potassium borohydride, hydrazine, citrate salt and mixtures thereof.

7. The method of claim 1, wherein concentration of said first reducing agent in said first solution and said second reducing in second solution is from about 0.01 molar to about 0.05 molar.

8. The method of claim 1, wherein the temperature of said preparation of said hydrogen storage based electrode ranges from about 30° C. to about 90° C.

9. The method of claim 1, wherein said treating of said powder is done for a duration of about 1 hour to about 5 hours.

10. The method of claim 1, wherein said treating of said powder is configured to remove metal oxide from the surface of said powder.

11. The method of claim 1, wherein said treating of said electrode is done for a duration of about 10 minutes to about 60 minutes.

12. The method of claim 1, wherein said treating of electrode is configured to remove the metal oxide from the surface of said electrode.

13. The method of claim 1, wherein said fabricating of said electrode further comprises pasting a slurry onto a metal foam.

14. The method of claim 13, wherein said slurry comprises said powder, an additive and a binder.

15. The method of claim 13, wherein said additive is one of nickel powder, cobalt powder or activated carbon.

16. The method of claim 13, wherein said binder is one of PTFE, PVA and CMC.

17. The method of claim 1, wherein said electrode is used in an electrochemical system in transportation applications, residential applications, commercial and industrial facilities, portable power sources, laptop, mobile phones and large-scale power generation applications.

18. The method of claim 17, wherein said electrochemical system is one of a fuel cell, a regenerative fuel cell or a metal hydride battery.

19. An electrochemical system for storage of hydrogen comprising a metal hydride electrode, wherein said electrode is prepared by:
    treating a powder comprising said metal hydride with a first solution comprising a first alkaline base and a first reducing agent;
    fabricating said electrode using said powder; and
    treating said electrode with a second solution comprising a second alkaline base and a second reducing agent.

* * * * *